United States Patent
Beatty et al.

(10) Patent No.: US 8,606,752 B1
(45) Date of Patent: Dec. 10, 2013

(54) METHOD AND SYSTEM OF RESTORING ITEMS TO A DATABASE WHILE MAINTAINING REFERENTIAL INTEGRITY

(75) Inventors: Louis Beatty, Ormond, FL (US); Deepak Saraf, Windermere, FL (US)

(73) Assignee: Symantec Corporation, Mountain View, CA (US)

( * ) Notice: Subject to any disclaimer, the term of this patent is extended or adjusted under 35 U.S.C. 154(b) by 259 days.

(21) Appl. No.: 12/893,721

(22) Filed: Sep. 29, 2010

(51) Int. Cl.
*G06F 17/30* (2006.01)

(52) U.S. Cl.
USPC .......................................... 707/640; 707/679

(58) Field of Classification Search
USPC ................................................ 707/640, 679
See application file for complete search history.

(56) References Cited

U.S. PATENT DOCUMENTS

| | | | |
|---|---|---|---|
| 5,276,860 A | 1/1994 | Fortier et al. | |
| 5,535,381 A | 7/1996 | Kopper | |
| 5,555,371 A | 9/1996 | Duyanovich et al. | |
| 5,559,991 A | 9/1996 | Kanfi | |
| 5,835,953 A | 11/1998 | Ohran | |
| 5,991,542 A | 11/1999 | Han et al. | |
| 6,029,168 A | 2/2000 | Frey | |
| 6,085,298 A | 7/2000 | Ohran | |
| 6,101,585 A | 8/2000 | Brown et al. | |
| 6,360,330 B1 | 3/2002 | Mutalik et al. | |
| 6,366,987 B1 | 4/2002 | Tzelnic et al. | |
| 6,542,962 B2 | 4/2003 | Kodama et al. | |
| 6,640,278 B1 | 10/2003 | Nolan et al. | |
| 6,665,815 B1 | 12/2003 | Goldstein et al. | |
| 6,714,952 B2 | 3/2004 | Dunham et al. | |
| 6,829,688 B2 | 12/2004 | Grubbs et al. | |
| 6,847,983 B2 | 1/2005 | Somalwar et al. | |
| 6,865,655 B1 | 3/2005 | Andersen | |
| 6,880,051 B2 | 4/2005 | Timpanaro-Perrotta | |
| 6,910,112 B2 | 6/2005 | Berkowitz et al. | |
| 6,938,135 B1 | 8/2005 | Kekre et al. | |
| 6,976,039 B2 | 12/2005 | Chefalas et al. | |
| 7,149,858 B1 | 12/2006 | Kiselev | |
| 7,290,017 B1 | 10/2007 | Wang et al. | |
| 7,290,101 B1 | 10/2007 | Kekre et al. | |
| 7,330,997 B1 * | 2/2008 | Odom | ......................... 714/6.23 |

(Continued)

FOREIGN PATENT DOCUMENTS

| | | | |
|---|---|---|---|
| EP | 838758 | | 4/1998 |
| JP | 06223118 A | * | 8/1994 |

OTHER PUBLICATIONS

How to Use Windows XP: Restoring Your Backup Files, Jan. 15, 2004, pp. 1-4.*

(Continued)

*Primary Examiner* — Albert Phillips, III
(74) *Attorney, Agent, or Firm* — Rory D. Rankin; Meyertons, Hood, Kivlin, Kowert & Goetzel, P.C.

(57) ABSTRACT

A system and method for restoring list items to a database while maintaining the referential integrity of the list items. Before requested list items are restored to a database, a dependencies tablemetadata is read to determine the links between list items of the database. A map is created, and the links between list items are stored in the map. When the requested list items are restored to the database, the requested items and any dependent items are identified from the map and restored to the database. By restoring the dependent items of the selected item to be restored, referential integrity of the database is maintained.

20 Claims, 5 Drawing Sheets

| Map 410 | | |
|---|---|---|
| Object ID | Dependent Object IDs | Pointer to Data Object |
| 311 | 341, 373, 342 | 401 |
| 312 | 343, 377 | 402 |
| 313 | 344, 379, 387 | 403 |
| 341 | 373 | 435 |
| 342 | - | 436 |
| 343 | 377 | 437 |
| 344 | 379, 387 | 438 |
| 373 | - | 463 |
| 377 | - | 467 |
| 379 | - | 477 |
| 387 | - | 490 |
| . | . | . |
| . | . | . |

(56) References Cited

U.S. PATENT DOCUMENTS

| | | | |
|---|---|---|---|
| 7,389,314 | B2 | 6/2008 | Kulkarni et al. |
| 7,549,032 | B1 | 6/2009 | Kekre et al. |
| 7,596,713 | B2 | 9/2009 | Mani-Meitav et al. |
| 7,617,414 | B2 | 11/2009 | Becker et al. |
| 7,672,934 | B1 | 3/2010 | Beatty et al. |
| 2003/0163495 | A1 | 8/2003 | Lanzatella et al. |
| 2003/0177149 | A1 | 9/2003 | Coombs |
| 2004/0117763 | A1* | 6/2004 | Fjallstrom et al. ............ 717/108 |
| 2004/0243928 | A1 | 12/2004 | Hesmer et al. |
| 2004/0267839 | A1 | 12/2004 | Mendonca et al. |
| 2004/0268068 | A1 | 12/2004 | Curran et al. |
| 2005/0138087 | A1 | 6/2005 | Beck et al. |
| 2006/0041556 | A1 | 2/2006 | Taniguchi et al. |
| 2006/0230116 | A1 | 10/2006 | Couper et al. |
| 2008/0307000 | A1 | 12/2008 | Paterson et al. |
| 2009/0157765 | A1* | 6/2009 | Anderson et al. ............ 707/202 |
| 2009/0210427 | A1 | 8/2009 | Eidler et al. |

OTHER PUBLICATIONS

Oracle Database Backup and Recovery Advanced User's Guide 10g Release 2, Nov. 2005, pp. 17-1 through 17-22.*

Miller, Build Your Own SQL Server 2008 Object Dependency Viewer, Mar. 14, 2009, pp. 1-5.*

"Windows DDK Glossary," http://msdn.microsoft.com/library/default.asp?url=/library/en-us/gloss/hh/gloss/glossary_628b1dfc-c8f0-4143-a4ef-0dddae24be4b.xml.asp, (3 pages).

"Repliweb R-1 User Guide—Version 3.1," RepliWeb, Inc., 2002, (27 pages).

"FilesX Xchange RestoreTM for Microsoft Exchange Server," FilesX, Inc., Aug. 2003, (2 pages).

"Instructor Articles," VERITAS Education, pp. 1-7, Apr. 2003.

"EMC TimeFinder Family," EMC Corporation, 8 pages, Oct. 2004.

"EMC TimeFinder Local Replication," EMC Corporation, 2 pages, Oct. 2004.

"Storage Area Networking-High-Speed Data Sharing Among Multiple Computer Platforms", Tivoli Systems, Inc., Copyright 2000. ftp://ftp.software.ibm.com/software/tivoli/whitepapers/san_datasharing_wp.pdf, (2000), 4 pages.

"Storage Management-Best Practices", Copyright 2001, IBM Corp., ftp://ftp.software.ibm.com/software/tivoli/whitepapers/wp-storage-bp.pdf, (2001), 11 pages.

Amiri, Khalil S., "Scalable and manageable storage systems", Ph.D. Thesis, Dept. of Electrical and Computer Engineering, Carnegie Mellon University, Pittsburgh, PA, http://www.pdl.cmu.edu/PDL-FTP/NASD/amiri_thesis.pdf, (Dec. 2000), i-241 pgs.

Wylie, Jay J., et al., "Selecting the Right Data Distribution Scheme for a Survivable Storage System", Research Paper, School of Computer Science, Carnegie Mellon University, Pittsburgh, PA, http://www.pdl.cmu.edu/PDL-FTP/Storage/CMU-CS-01-120.pdf, May 2001), pp. 1-21.

* cited by examiner

Dependencies Table 310

| Object ID | Dependent Object ID |
|---|---|
| 311 | 341 |
| 311 | 342 |
| 312 | 343 |
| 313 | 344 |
| . | . |
| . | . |

Dependencies Table 320

| Object ID | Dependent Object ID |
|---|---|
| 341 | 373 |
| 343 | 377 |
| 344 | 379 |
| 344 | 387 |
| . | . |
| . | . |

*FIG. 3*

| Map 410 | | |
|---|---|---|
| Object ID | Dependent Object IDs | Pointer to Data Object |
| 311 | 341, 373, 342 | 401 |
| 312 | 343, 377 | 402 |
| 313 | 344, 379, 387 | 403 |
| 341 | 373 | 435 |
| 342 | - | 436 |
| 343 | 377 | 437 |
| 344 | 379, 387 | 438 |
| 373 | - | 463 |
| 377 | - | 467 |
| 379 | - | 477 |
| 387 | - | 490 |
| . | . | . |
| . | . | . |

*FIG. 4*

METHOD AND SYSTEM OF RESTORING ITEMS TO A DATABASE WHILE MAINTAINING REFERENTIAL INTEGRITY

BACKGROUND OF THE INVENTION

1. Field of the Invention

The present invention relates generally to backing up and restoring databases, and in particular to a method and system for restoring items to a database while maintaining referential integrity.

2. Description of the Related Art

Organizations frequently use databases to store data vital to their company's operations. Because of the importance of the information stored in databases, mechanisms are needed to backup the databases. In particular, a database is often backed up as a single, monolithic database file, which contains all the tables, records, and indexing information for the database. When it becomes necessary to restore the database, or portions of the database, different types of restore operations are possible.

There are many different varieties of databases that may be used to fit the needs of an organization. For example, one type of a database may be a Microsoft®SharePoint® database. A Microsoft® SharePoint® database may be a collection of products and software elements that includes a plurality of components, web browser based collaboration functions, process management modules, search modules and a document-management platform. SharePoint may also be used to host web sites that access shared workspaces, information stores, documents, and host-defined applications such as blogs. SharePoint users may manipulate proprietary controls called "web parts" or interact with pieces of content such as lists and document libraries.

Data and files generated in highly customized Microsoft Office® or Access® applications may be incorporated in a SharePoint database. These applications may contain lists that are dependent on each other. The data from these applications may be backed up, and then when the data is restored, the relationships between the list items may need to be preserved for the applications to function as they did prior to the backup and restore operations. For example, a user may select an individual item to be restored, and the user may not know that the selected item has dependent items that must also be restored for the application to be rebuilt to its previous state. If only the user selected item is restored to the application, the application may not work or function as intended.

In view of the above, improved methods and mechanisms for restoring items from a backup copy of a database to maintain the relationships between dependent items are desired.

SUMMARY OF THE INVENTION

Various embodiments of methods and mechanisms for restoring list items to a database while maintaining referential integrity are contemplated. In one embodiment, a database may comprise a plurality of lists with each list containing a plurality of items. Many of the list items may have links to items of separate lists. After a backup of the database has been performed, a request may be made to restore one or more list items to the database. In response to receiving the restore request, a backup application may build an index for locating items within the backup copy of the database. Then, the backup application may read metadata associated with the requested list items to identify and retrieve the relationships between stored objects that correspond to the list items. The metadata may be a dependencies table, schema, or other type of data associated with the links between list items. The backup application may build a map based on the metadata. The backup application may then search the map to determine if the requested list items have any dependent list items. An application server may then use the index to locate and retrieve the requested list items and any dependent list items from the backup copy of the database and restore the items to the target database.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 3 illustrates embodiments of two dependencies tables.

FIG. 4 illustrates one embodiment of a map used to restore list items and dependent list items.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein.

DETAILED DESCRIPTION

Figure 1:
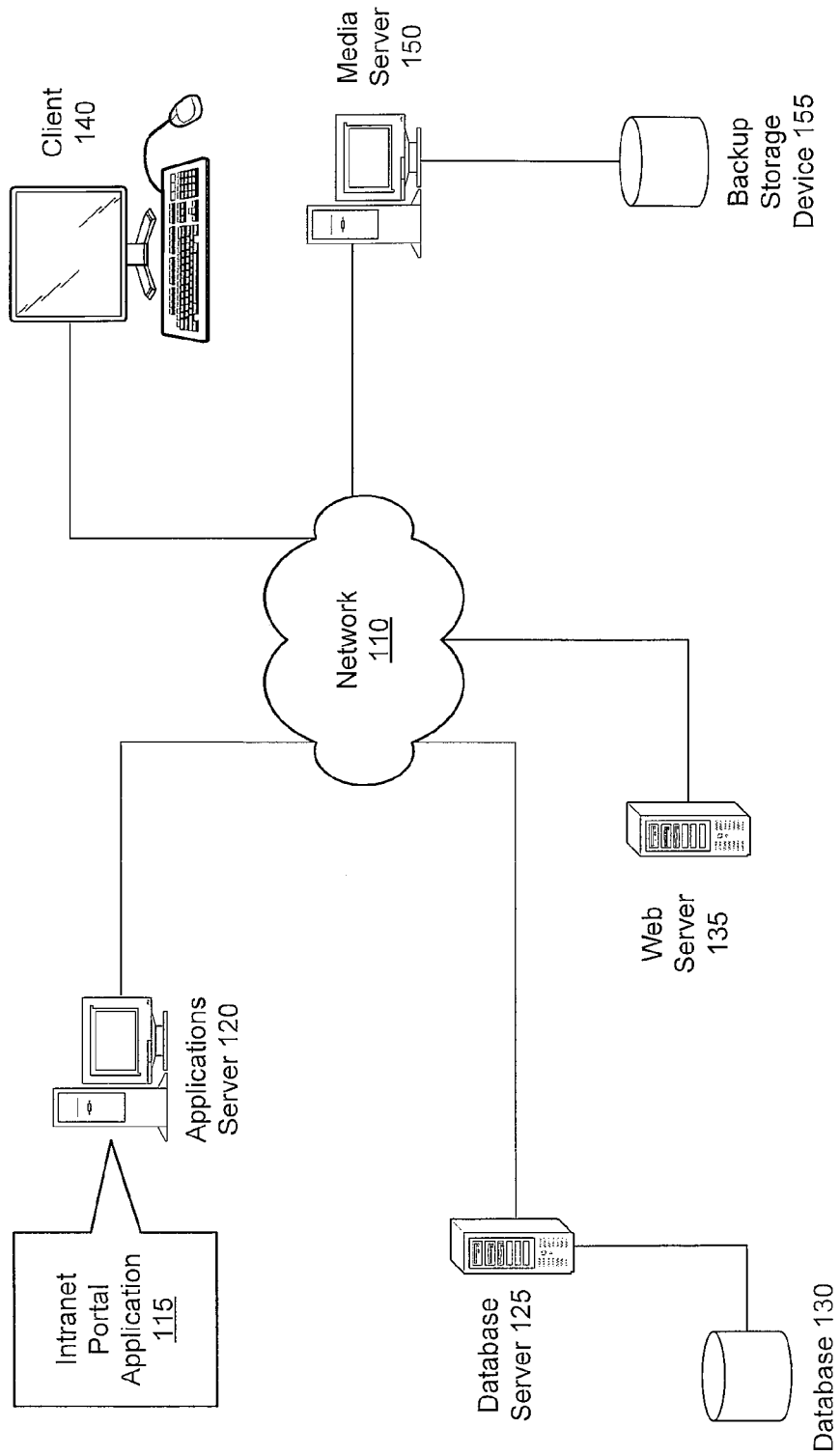
FIG. 1 is a diagram that illustrates a network architecture in accordance with one or more embodiments.

Referring to FIG. 1, a generalized block diagram of one embodiment of a network architecture is shown. Other embodiments of network architectures including different components and connections than those shown in FIG. 1 are possible and contemplated. Database server 125 is coupled to database 130, and in one embodiment, database server 125 may be a Microsoft SQL server. Database server 125 is also coupled to network 110. Network 110 may comprise a variety of network connections including combinations of local area networks (LANs), such as Ethernet networks, Fiber Distributed Data Interface (FDDI) networks, token ring networks, and wireless local area networks (WLANs) based on the Institute of Electrical and Electronics Engineers (IEEE) 802.11 standards (Wi-Fi), and wide area networks (WANs), such as the Internet, cellular data networks, and other data communication networks. Other network connections and architectures are possible and contemplated.

Web server 135 is also connected to network 110. Web server 135 may provide user access to an application associated with one or more application objects. Network 110 may have one or more web servers each providing a separate application or multiple web servers distributing the same application. Web server 135 may provide an application object model access to data stored in database 130 by communicating with database server 125. Web server 135 and database server 125 may communicate via an application program interface (API) shared by the application objects served by web server 135 and database server 125.

Applications server 120 is also connected to network 110. Applications server 120 is representative of any number of applications servers that may be connected to network 110. Applications server 120 may host intranet portal application 115; intranet portal application 115 may access content in database 130 through database server 125. In some embodiments, intranet portal application 115 may be a SharePoint application. While embodiments of the present invention are not limited to use in conjunction with SharePoint applications or SharePoint databases, embodiments of the present invention can be used with SharePoint databases and examples will be provided using SharePoint terminology. It should be understood that the use of such terminology is not meant to be limiting, and embodiments of the present methods and mechanisms can be used with a variety of applications in a database environment.

Intranet portal application 115 may include tables, records, lists of items, corresponding globally unique identifiers (GUIDs), and other data objects that are used to present a view of web pages within a website to a user. Applications server 120 may store a plurality of tables relating to these items. These tables may include a webparts table, navnodes table, docs table, userdata table, sites table, lists table, and others. The webparts table may store a list of all the web parts available to the sites. The webparts table may have a site identifier (ID) column with GUID links to the sites table. The webparts table may also have a list ID column, with GUID links to the lists table. The navnodes table may store a list of navigation nodes that are displayed in the navigation bars in SharePoint. The docs table may store metadata about a plurality of documents. The docs table may include a column of site IDs storing the site to which each document of the plurality of documents belongs. The userdata table may store the data that is displayed in the lists. The sites table may store a list of SharePoint sites on a virtual server. The lists table may store information about lists that are on each SharePoint site. Intranet portal application 115 may also generate GUIDs to reference records, lists of items, and linked lists. These links may be broken when new GUID values are generated as part of a restoration operation. As a result, the content and appearance of the restored web pages may not appear the same as the web pages did prior to being backed up.

Media server 150 is also coupled to network 110 and may be configured to store backup data in backup storage device 155. Media server 150 is representative of any number of media servers coupled to network 110. Backup storage device 155 is representative of any number of backup storage devices, and may comprise any of a variety of types of storage medium, such as a hard disk drive, an optical drive, or other storage medium. Backup storage device 155 may be further coupled to several varieties of storage devices consisting of one or more hard disks, tape drives, server blades, or specialized devices, and may include a variety of memory devices such as RAM, Flash RAM, MEMS (Micro Electro Mechanical Systems) storage, battery-backed RAM, and/or non-volatile RAM (NVRAM), etc. In other embodiments, media server 150 may have a network connection to a remote storage medium or access to a storage area network (SAN).

Media server 150 may be configured to run a variety of types of backup applications that provide snapshots of data at the time the backup is performed. For example, media server 150 may backup database 130 by directly accessing the data via database server 125. In one embodiment, a full monolithic backup of database 130 may be performed via the SQL interface of database server 125 without regard to the specific data structures stored within the database. In another embodiment, a backup of database 130 may be performed and metadata associated with a plurality of list items of database 130 may be stored with the backup database copy. In a further embodiment, media server 150 may perform a granular backup to backup specific objects by accessing a particular application object's data via the associated application's web server 135.

Client 140 is also connected to network 110, and client 140 is representative of any number of stationary or mobile computers such as servers, desktop PCs, laptops, handheld computers, smartphones, or others. Client 140 may access database server 125, web server 135, and intranet portal application 115 on application server 120 through network 110.

The applications, database, web, media servers and clients of FIG. 1 may comprise various hardware and software components. The hardware components may include one or more processors, memory devices, and input/output (I/O) devices. The software components may include an operating system stored in a memory device. The operating systems may be any of various types of operating systems, such as Microsoft Windows®, Linux®, Solaris®, or others. The operating system may be operable to provide various services to the user and may support the execution of various programs such as intranet portal applications, backup applications, server applications, software agents, or any of a variety of other applications.

Database 130 may be accessed by one or more application objects that store data in database 130. Database 130 may represent both a database program and/or one or more actual databases implemented therein. The database program refers to the executable commands, user interfaces and other program code for operating the database. The included databases may further comprise various tables, indexes, relationships, queries, stored procedures, file systems, security layers, networking interfaces, etc., which are configured to operate on a plurality of data records, also referred to as records or entries, that constitute the "database."

In one embodiment in which database 130 is a relational database, the records may be entries arranged in tables (row and column arrangement). A collection of associated records may be collectively described as a "table" in the database. A record may consist of one or more fields, which may serve as indexes (or keys) to other records in other tables. For example, in a document management database, each record in a document table may represent a document (or data object) stored in the database. In one embodiment, the document (data object) may be stored in the fields of the record itself. In another embodiment, the document (data object) may be represented in a record by a reference to the document, such as a memory location. In one embodiment, database 130 may be a Microsoft SQL Server database. In another embodiment, database 130 may comprise a SharePoint content database, or the application using the database may be a SharePoint application. An object may be one of many types within a SharePoint database, including a Site object, a Web object, a List object, and others.

In other embodiments, the number and type of databases, clients, servers, networks, and storage devices is not limited to those shown in FIG. 1. Any number and combination of servers, desktops, laptops, and mobile clients may be interconnected in network architectures via various combinations of modem banks, direct LAN connections, wireless connections, WAN links, etc. Also, at various times one or more clients and servers may operate offline. In addition, during operation, individual client and server connection types may change as mobile users travel from place to place connecting, disconnecting, and reconnecting to network 110.

Figure 2:
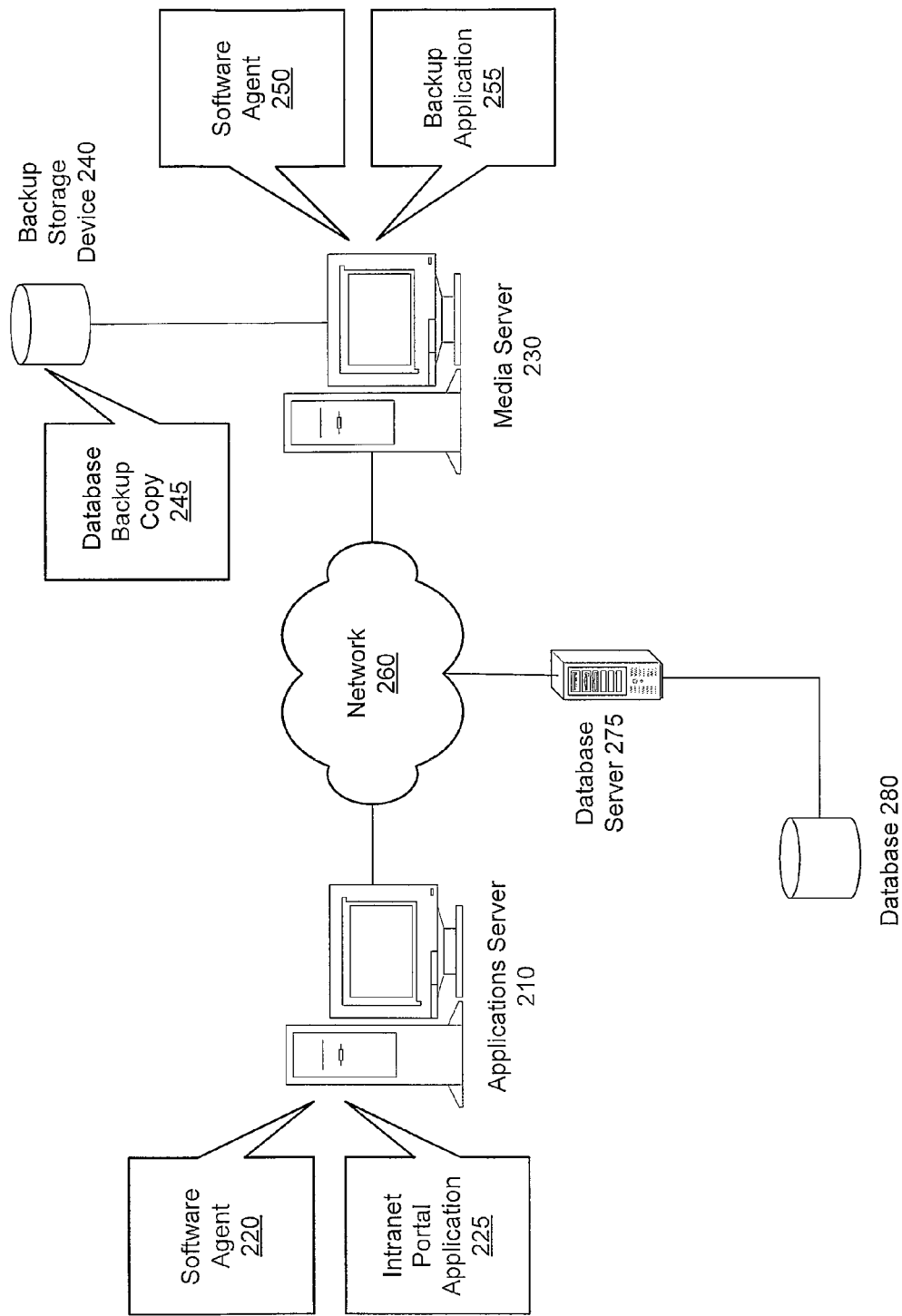
FIG. 2 illustrates one embodiment of a database archival system.

Turning now to FIG. 2, a block diagram of one embodiment of a database archival system is illustrated. The database archival system includes applications server 210, database server 275, and media server 230 connected to network 260. Applications server 210 and media server 230 may each comprise a file system that may be stored within an internal or external memory. As referred to herein, a "file system" shall mean an information system which references and stores data, hierarchically organized in files and directories, in a volume created on a storage medium. The file system provides access to the data on a storage medium. Media server 230 may also be connected to backup storage device 240. Media server 230 may host software including backup application 255; backup storage device 240 may be accessed by backup application 255 to store backup datasets, such as database backup copy 245. Backup application 255 may access database 280 through database server 275. In one embodiment, database server 275 may be a Microsoft SQL server. In addition to backing up database 280, backup application 255 may also restore items from database backup copy 245 to database 280. In one embodiment, when objects are restored by backup application 255, they may be stored in a file system prior to being restored to the working copy of mounted database 280.

Backup application 255 may also be configured to generate and store metadata including a schema of table and index information along with the database backup copy 245. Database backup copy 245 may be an instance of a mounted database file previously created by database 280. The schema may then be used to access or restore the contents of database backup copy 245, without using database 280. Site collections, sites, list, document libraries, and items within database 280 may be backed up by backup application 255. When database 280 is backed up, a query may be run to retrieve data, such as a schema of tables, defining the structure of database 280. The schema may then be stored in association with database backup copy 245. When a restore operation is performed, the links between lists of database 280 may need to be determined to properly restore any requested items. In one embodiment, the links may include the links from columns in one list to columns in another list.

Backup application 255 may be operable to selectively archive copies of objects and records from database 280 on backup storage device 240. Alternatively, selected objects and records may be transferred from database 280 to a remote archive storage (not shown) through a network interface. In various embodiments, backup application 255 may also restore objects, records, or other data acquired from previous archive operations to database 280. Backup application 255 may also be configured to provide other known archiving functionality, as desired, such as various features provided by Backup Exec™ products from Symantec®.

In one embodiment, software agent 250 on media server 230 may store the items or objects selected for restoration in a file system before sending them to software agent 220 on applications server 210. In another embodiment, software agent 220 on applications server 210 may receive the objects from media server 230 and store them in a file system before restoring them to database 280. The data that is stored in backup storage device 240 by media server 230 as part of database backup copy 245 may correspond to a full web site. After the backup of the database has been performed, software agent 220 may receive a restore request for one or more items. Software agent 220 may perform functions to completely restore data corresponding to the web site to database 280.

Applications server 210 may host a plurality of software applications, including intranet portal application 225. Intranet portal application 225 may be operable to manage and maintain a plurality of web pages and supported objects for a plurality of users. In one embodiment, intranet portal application 225 may be a Microsoft® SharePoint® Server or a similar enterprise information portal program. In another embodiment, intranet portal application 225 may comprise web site development software to develop different types of web sites through the use of a template based architecture. One or more users may provide changes to a deployed web site definition by adding, deleting, and modifying information stored in tables, records, sites, lists, and other objects. Such changes may include creating links between various objects of the database. In one embodiment, intranet portal application 225 may be configured to be the 'user' of a database. In some embodiments, intranet portal application 225 may manage and organize database content as items within lists. Items may be documents, announcements, tasks, discussion topics, or other types of electronic content and a list may be a logical group of items.

In one embodiment, intranet portal application 225 may store the relationships between lists and items in a dependencies table. The dependencies table may be a relationship table that maps GUIDs of objects from an objects table. The objects may refer to corresponding list items. Backup application 255 may run a query on the dependencies table for a specific object ID, and the query may return relationship IDs corresponding to relationships of the specific object. Then, backup application may lookup the relationship IDs in the objects table to find out which object entries are being pointed to by the relationship IDs. Backup application 255 may create a map and store the links between list items and dependent list items in the map. Backup application 255 may also store the object IDs corresponding to the item IDs in the map. Alternatively, rather than identifying and storing such relationships at the time of backup, the backup application 255 may determine the relationships between objects and dependent objects from the metadata associated with database backup copy 245. Subsequently, backup application 255 may build a map based on the metadata. In one embodiment, backup application 255 may also perform a backup of the data in database 280 and store the data or pointers to the data in the map. In another embodiment, backup application 255 may perform a backup of the data in database 280 and store the data in a file separate from the map. In some embodiments, backup application 255 may send the map to application server 210 as part of a restore operation.

In a further embodiment, intranet portal application 225 may store the relationships between lists and items in other tables, and backup application 255 may retrieve the relationship information from these other tables. In a still further embodiment, database server 275 may store a plurality of tables with information on the relationships between list items and dependent list items in database 280. One of these tables stored by database server 275 may be a dependencies table. The dependencies table may comprise one or more tables.

The data stored within database 280 by intranet portal application 225 may be organized according to sites, sub-sites, lists, and items. The relationships between sites, sub-sites, lists and items may be hierarchical relationships within an application object hierarchy. For example, child objects, such as lists, may inherent characteristics of parent objects, such as sub-sites or sites. In one embodiment, when backup application 255 restores a child object to database 280, any parent objects that are not already restored may be restored before the child object. After the parent objects have been restored, the child object may then be restored to database 280. This order of restoration may allow the child to be properly placed in the hierarchy and to inherit characteristics from the parent objects.

A user interface for selecting items or objects to be restored may be provided. In one embodiment, a backup dataset may be recovered from database backup copy 245 to a temporary location. A user may then be presented with a browsable view of the recovered dataset. In another embodiment, metadata associated with the items or objects stored in the backup copy of the database may be read and used to present the user with a view of the database backup. The user may browse the view of the database backup and select items to be restored. In one embodiment, the view may be a tree-like structure with nodes for sites, subsites, lists, and list items. Items within the view may have dependent items connected below them on lower branches of the tree. For example, a site node of the tree may be connected to a leaf node corresponding to a subsite dependent on the site. In other embodiments, the view may be displayed using different structures.

Once an item has been identified, backup application 255 may retrieve the requested item from the backup dataset as an item file. In one embodiment, backup application 255 may extract the item from one or more records that matched a key during a query of a document table within database backup copy 245. Backup application 255 may then generate an item file comprising the item stored in a raw or well-known file format. Examples of file formats may include a .txt text file, a .doc file, a .jpg or .gif image file, etc.

In another embodiment, when a user requests items to be restored, backup application 255 may create an index corresponding to database backup copy 245. In one embodiment, the index may be created by reading database backup copy 245 and its associated metadata. The index may then be used for locating items within database backup copy 245. In various embodiments, the index may contain a listing of items and corresponding pages where the items are stored within database backup copy 245. The index may also contain offsets to other pages where other items are located within database backup copy 245. In various embodiments, the index may be cached on a disk storage medium in media server 230, or the index may be stored on another storage medium.

In a further embodiment, when a user selects items for restoration, backup application 255 may perform operations to identify and restore all the items in the hierarchy linked to each selected object without the user having to identify all of the additional items in the hierarchy. For example, if a list item is selected, then any site or sub-site items with which the list items is associated may also be subject to restore operations. In order to identify additional items which may need to be restored, backup application 255 may read metadata associated with database backup copy 245 to determine whether the selected item has any dependent items. Having found one or more dependent items, the application 255 may repeat the process in a recursive manner to identify items which depend on the newly found dependent items. Thus, backup application 255 may perform a series of steps in a recursive like fashion to restore the hierarchy of items. Also, prior to restoring any items to the database, backup application 255 may check the database to see if the item already exists in the database. If the item already exists in the database, backup application 255 may skip restoring the item to the database.

In some embodiments, the top object in a hierarchy necessary to restore a selected object may be the first object restored. Backup application 255 may read metadata table data from database backup copy 245 related to the object. Once the metadata related to the object has been read from the table, a determination may be made as to whether the object is already present in database 280. If the object is not already present in database 280, then the object may be created in database 280 using the data retrieved from database backup copy 245.

Subsequent to creating the object in database 280 or determining that that object has already been restored, a determination may be made as to whether the object selected by the user has any dependent objects. If the selected object has dependent objects, then a next dependent object may be selected, which may be the next object in the hierarchy. Then, the next dependent object may be restored, and this process may repeat itself until all the dependent objects of the object selected by the user have been restored.

By using the restoration method described above, an entire hierarchy necessary to support a user selected object within database backup copy 245 may be restored to database 280. In addition, all the characteristics of that object may be restored by accessing the tables stored within database backup copy 245 that contain the characteristics necessary to describe the requested object. If an object needs to be created in database 280, the backup application 255 may access application server 210 to create the object in database 280 using the characteristics information pulled from the tables in the database backup copy 245. In this manner, the structures necessary for application server 210 to access the object may be created. In one embodiment, schema may be used to access database backup copy 245 to identify and retrieve the selected objects and list items. Generally speaking, the schema may refer to the data structure of database 280. The schema may be used to access or restore the contents of database backup copy 245, without using database 280.

Applications server 210 may comprise software agent 220 and media server 230 may comprise software agent 250. In some embodiments, software agents 230 and 250 may be software routines that wait to detect predetermined events and perform one or more actions when the events occur. Software agent 250 may be software configured to assist backup application 255 in performing one or more backup and restore functions. In one embodiment, software agent 250 may also be configured to perform one or more backup functions independently of backup application 255. Also, software agent 220 on applications server 210 may perform independent functions during a restoration of a web site. These independent functions may allow a web site to be restored completely with customizations. Customizations may be lost due to broken links caused by newly generated GUIDs created during the restoration process by intranet portal application 225. Software agent 220 may also maintain copies of a restored web parts table and a restored navigation nodes table. A mapping of the GUIDs in these tables may be maintained in these copies or in another storage medium. In one embodiment, software agent 220 may maintain this mapping. In another embodiment, software agent 220 may store this mapping in a cache.

Referring now to FIG. 3, embodiments of two dependencies tables are shown. In another embodiment, the dependencies table may comprise a single table. In a further embodiment, the dependencies table may comprise a plurality of tables. In FIG. 3, two dependencies tables are shown: dependencies table 310 and dependencies table 320. Dependencies table 310 may store object IDs for objects at the highest level of hierarchy within an intranet portal application hierarchy.

Dependencies table 320 may store object IDs for objects at a lower level of the hierarchy.

Dependencies table 310 may contain two columns: an object ID column and a dependent object ID column. Dependencies table 310 may comprise entries for object IDs 311-313. Object IDs 311-313 are representative of any number of object IDs that may have entries in dependencies table 310. Object ID 311 may have two entries in dependencies table 310; one entry is for dependent object ID 341 and the other entry is for dependent object ID 342. Object ID 312 may have an entry for dependent object ID 343, and object ID 313 may have an entry for dependent object ID 344.

Dependencies table 320 may also contain an object ID column and a dependent object ID column. Object ID 341 may have an entry in dependencies table 320 for dependent object ID 373. Object ID 343 may have an entry for dependent object ID 377. Object ID 313 may have an entry for dependent object ID 379 and an entry for dependent object ID 387.

In one embodiment, object ID 311 may correspond to a list item with ID 311. The other object IDs may also correspond to list item IDs of the same ID number. In another embodiment, object ID 311 may correspond to a list item with an ID other than 311. The other object IDs may also correspond to list item IDs with different ID numbers. There may be another table or map that links object IDs with corresponding list IDs. In a further embodiment, dependencies tables 310 and 320 may have other types of columns and/or more than 2 columns. Other types of dependencies tables are possible and contemplated.

Turning now to FIG. 4, one embodiment of a map used to restore list items and dependent list items is shown. Map 410 may have 3 columns of entries for each row. In other embodiments, map 410 may have any number of columns. Map 410 is one embodiment of a map that may be used to restore list items and dependent list items to a database. The first column in map 410 may contain object IDs. The object IDs may correspond to list items stored as data objects in a database. The second column may contain dependent object IDs, and the third column may contain a pointer to the location of the data object in a storage medium, such as backup storage device 240 of FIG. 2.

Object ID 311 may be associated with a total of three dependent object IDs. Object ID 311 may have two dependent objects with IDs 341 and 342. Object ID 341 may also have a dependent object with ID 373. Therefore, object ID 311 is also dependent on object ID 373. The pointer to the data object corresponding to object ID 311 may store a value of 401, which may correspond to a particular location within a storage medium. Object ID 312 may have two dependent objects with IDs 343 and 377, and the pointer to the corresponding data object may store a value of 402. Object ID 313 may have three dependent objects with IDs 344, 379, and 387, and the pointer may store a value of 403. Object ID 341 may have one dependent object with ID 373, and the pointer may store a value of 435. Object ID 342 may have no dependent objects, and the pointer may store a value of 436. Object ID 343 may have one dependent object with ID 377, and the pointer may store a value of 437. Object ID 344 may have two dependent objects with IDs 379 and 387, and the pointer may store a value of 438. Object IDs 373, 377, 379, and 387 may have no dependent objects, and the pointers may store values of 463, 467, 477, and 490, respectively. Map 410 may contain more entries (not shown) corresponding to additional data objects. Alternatively, the data in map 410 may be arranged in other formats than columns and entries. In further embodiments, other types and structures of maps are possible and contemplated.

Figure 5:
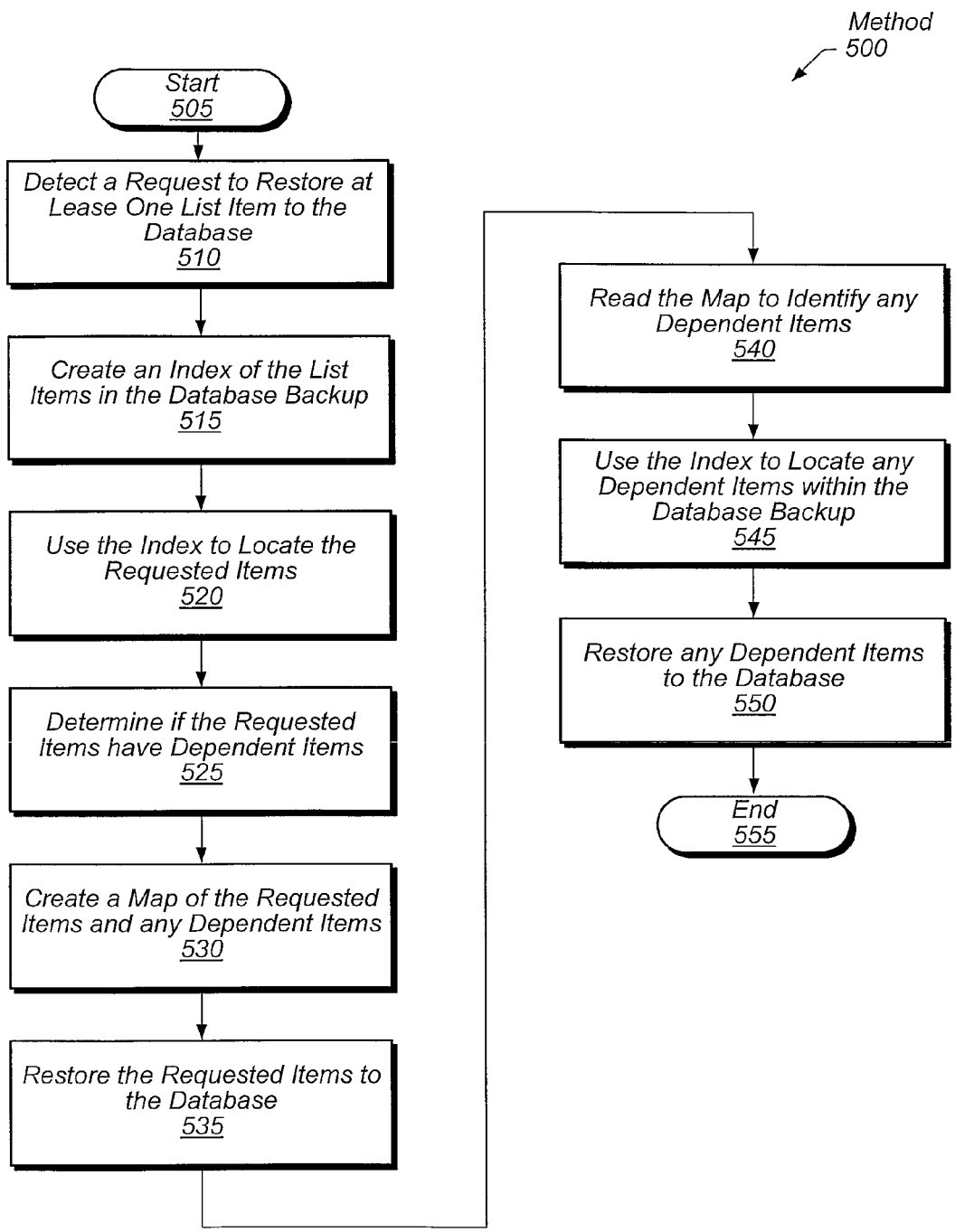
FIG. 5 is a generalized flow diagram illustrating one embodiment of a method to restore items to a database.

Referring now to FIG. 5, an embodiment of a method 500 for restoring list items from a database backup is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

The method 500 starts in block 505, and then a request to restore at least one list item to the database may be detected in block 510. In block 515, an index of all of the list items in the backup copy of the database may be created. Following this, the index may be used to locate the requested list items within the backup copy of the database in block 520. Then, metadata associated with the requested list items may be read to determine if there are any dependent list items of the requested list items (block 525). As described above, identifying dependent items may entail a recursive process or find dependent items and repeating the process for the newly found dependent items. Next, a map may be created of the requested list items and the dependent list items in block 530. Then, the requested list items may be restored to the database (block 535). In block 540, the map may be read to identify any dependent list items of the requested list items. Next, the index may be used to locate the dependent list items within the backup copy of the database (block 545). Then, the dependent list items may be restored to the database (block 550). After block 550, the method 500 may end in block 555.

As noted above, method 500 may entail a recursive like process for searching for dependent list items of the dependent list items. The metadata associated with the dependent list items may be read to determine if the dependent list items have dependent list items. Then the links between dependent list items and their dependent list items may be added to the map. The map may be read to identify these dependent list items of the dependent list items, and then the index may be used to locate these identified dependent of dependent list items. After the dependent of dependent list items are located, they may be restored to the database. The above steps may be repeated for as many levels as exist in the hierarchy of dependent of dependent list items.

It is noted that the above-described embodiments may comprise software. In such an embodiment, program instructions and/or a database (both of which may be referred to as "instructions") that represent the described systems and/or methods may be stored on a computer readable storage medium. Generally speaking, a computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, Flash memory, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A method for restoring data to a database, the method comprising:
    backing up at least a portion of the database, wherein the database stores information including a plurality of hierarchically organized list objects, wherein each of the list objects lists a plurality of items, wherein the hierarchically organized list objects include a chain of three or more list objects beginning at a starting list object and ending at a last list object, wherein each list object of the chain other than the starting list object is dependent on one of the other list objects of the chain, wherein said backing up the at least a portion of the database includes:
        storing, in a backup copy of the database, the plurality of hierarchically organized list objects; and
        generating a dependency map specifying dependencies between the hierarchically organized list objects, wherein the dependency map includes links that link together the chain of three or more list objects;
    detecting a request to restore the starting list object of the chain to the database; and
    in response to the request to restore the starting list object, restoring the chain of three or more list objects based on the dependency map, wherein the three or more list objects are restored in an order starting at the starting list object and ending at the last list object, wherein said restoring the chain comprises performing the following for each respective list object of the chain:
        a) accessing an index of the plurality of hierarchically organized list objects stored within the backup copy of the database to locate the respective list object within the backup copy of the database;
        b) restoring the respective list object to the database; and
        c) determining, from the dependency map, whether the respective list object has a dependent list object;
        wherein said accessing the index, said restoring, and said determining are repeated for the dependent list object if the respective list object has a dependent list object.

2. The method as recited in claim 1, wherein said backing up the at least a portion of the database further comprises:
    running a query to retrieve data which defines a structure of the database;
    storing the backup copy of the database; and
    storing the data which defines the structure of the database.

3. The method as recited in claim 1, further comprising:
    prior to restoring each respective list object of the chain to the database, restoring the respective list object from the backup copy of the database to a file system, wherein said restoring the respective list object to the database comprises restoring the respective list object from the file system to the database.

4. The method as recited in claim 1, further comprising:
    prior to restoring a list object to the database, checking the database to see if the list object already exists in the database; and
    in response to determining the list object already exists in the database, not restoring the list object to the database.

5. The method as recited in claim 1, wherein prior to detecting the request to restore the starting list object to the database, the method further comprises:
    reading metadata associated with the plurality of hierarchically organized list objects stored in the backup copy of the database; and
    using the metadata to present a view of the plurality of hierarchically organized list objects of the backup copy of the database to a user.

6. The method as recited in claim 1, wherein the dependency map comprises one or more dependencies tables.

7. The method as recited in claim 1,
    wherein said backing up the at least a portion of the database further includes storing one or more database tables in the backup copy of the website database describing characteristics of each list object of the chain of three or more list objects;
    wherein, for each respective list object of the chain, said restoring the respective list object comprises retrieving the characteristics of the respective list object from the one or more database tables and creating the respective list object in the database using the characteristics.

8. A non-transitory computer readable storage medium storing program instructions to restore data to a database, wherein when executed by a computer system, the program instructions are operable to cause the computer system to:
    backup at least a portion of the database, wherein the database stores information including a plurality of hierarchically organized list objects, wherein each of the list objects lists a plurality of items, wherein the hierarchically organized list objects include a chain of three or more list objects beginning at a starting list object and ending at a last list object, wherein each list object of the chain other than the starting list object is dependent on one of the other list objects of the chain, wherein in said backing up the at least a portion of the database the program instructions are operable to cause the computer system to:
        store, in a backup copy of the database, the plurality of hierarchically organized list objects; and
        generate a dependency map specifying dependencies between the hierarchically organized list objects, wherein the dependency map includes links that link together the chain of three or more list objects;
    detect a request to restore the starting list object of the chain to the database; and
    in response to the request to restore the starting list object, restore the chain of three or more list objects based on the dependency map, wherein the three or more list objects are restored in an order starting at the starting list object and ending at the last list object, wherein in said restoring the chain the program instructions are operable to cause the computer system to perform the following for each respective list object of the chain:
   a) access an index of the plurality of hierarchically organized list objects stored within the backup copy of the database to locate the respective list object within the backup copy of the database;
   b) restore the respective list object to the database; and
   c) determine, from the dependency map, whether the respective list object has a dependent list object;
   wherein the program instructions are operable to cause the computer system to repeat said accessing the index, said restoring, and said determining for the dependent list object if the respective list object has a dependent list object.

9. The non-transitory computer readable storage medium as recited in claim 8, wherein the program instructions are further operable to cause the computer system to:
   run a query to retrieve data which defines a structure of the database;
   store the backup copy of the database; and
   store the data which defines the structure of the database.

10. The non-transitory computer readable storage medium as recited in claim 8, wherein when executed the program instructions are further operable to cause the computer system to:
   prior to restoring each respective list object of the chain to the database, restore the respective list object from the backup copy of the database to a file system, wherein the program instructions are further operable to cause the computer system to restore the respective list object from the file system to the database.

11. The non-transitory computer readable storage medium as recited in claim 8, wherein when executed the program instructions are further operable to cause the computer system to:
   prior to restoring a list object to the database, check the database to see if the list object already exists in the database; and
   in response to determining the list object already exists in the database, not restore the list object to the database.

12. The non-transitory computer readable storage medium as recited in claim 8, wherein prior to detecting the request to restore the starting list object to the database, the program instructions are further operable to cause the computer system to:
   read metadata associated with the plurality of hierarchically organized list objects stored in the backup copy of the database; and
   use the metadata to present a view of the plurality of hierarchically organized list objects of the backup copy of the database to a user.

13. The non-transitory computer readable storage medium as recited in claim 8, wherein the dependency map comprises one or more dependencies tables.

14. The non-transitory computer readable storage medium as recited in claim 8,
   wherein in said backing up the at least a portion of the database the program instructions are further operable to cause the computer system to store one or more database tables in the backup copy of the website database describing characteristics of each list object of the chain of three or more list objects;
   wherein, for each respective list object of the chain, the program instructions are further operable to cause the computer system to restore the respective list object by retrieving the characteristics of the respective list object from the one or more database tables and creating the respective list object in the database using the characteristics.

15. A computer system comprising:
   a processor; and
   a memory storing program instructions;
   wherein the program instructions are executable by the processor to:
   backup at least a portion of a database, wherein the database stores information including a plurality of hierarchically organized list objects, wherein each of the list objects lists a plurality of items, wherein the hierarchically organized list objects include a chain of three or more list objects beginning at a starting list object and ending at a last list object, wherein each list object of the chain other than the starting list object is dependent on one of the other list objects of the chain, wherein in said backing up the at least a portion of the database the program instructions are executable by the processor to:
      store, in a backup copy of the database, the plurality of hierarchically organized list objects; and
      generate a dependency map specifying dependencies between the hierarchically organized list objects, wherein the dependency map includes links that link together the chain of three or more list objects;
   detect a request to restore the starting list object of the chain to the database; and
   in response to the request to restore the starting list object, restore the chain of three or more list objects based on the dependency map, wherein the three or more list objects are restored in an order starting at the starting list object and ending at the last list object, wherein in said restoring the chain the program instructions are executable by the processor to perform the following for each respective list object of the chain:
      a) access an index of the plurality of hierarchically organized list objects stored within the backup copy of the database to locate the respective list object within the backup copy of the database;
      b) restore the respective list object to the database; and
      c) determine, from the dependency map, whether the respective list object has a dependent list object;
      wherein the program instructions are executable by the processor to repeat said accessing the index, said restoring, and said determining for the dependent list object if the respective list object has a dependent list object.

16. The system as recited in claim 15, wherein the program instructions are further executable by the processor to:
   run a query to retrieve data which defines a structure of the database;
   store the backup copy of the database; and
   store the data which defines the structure of the database.

17. The system as recited in claim 15, wherein the program instructions are further executable by the processor to:
   prior to restoring each respective list object of the chain to the database, restore the respective list object from the backup copy of the database to a file system, wherein the program instructions are further executable by the processor to restore the respective list object from the file system to the database.

18. The system as recited in claim 15, wherein prior to detecting the request to restore the starting list object to the database, the program instructions are further executable by the processor:

read metadata associated with the plurality of hierarchically organized list objects stored in the backup copy of the database; and use the metadata to present a view of the plurality of hierarchically organized list objects of the backup copy of the database to a user.

19. The system as recited in claim 15, wherein the dependency map comprises one or more dependencies tables.

20. The system as recited in claim 15, wherein in said backing up the at least a portion of the database the program instructions are executable by the processor to store one or more database tables in the backup copy of the website database describing characteristics of each list object of the chain of three or more list objects;

wherein, for each respective list object of the chain, the program instructions are executable by the processor to restore the respective list object by retrieving the characteristics of the respective list object from the one or more database tables and creating the respective list object in the database using the characteristics.

* * * * *

UNITED STATES PATENT AND TRADEMARK OFFICE
CERTIFICATE OF CORRECTION

PATENT NO.         : 8,606,752 B1
APPLICATION NO.    : 12/893721
DATED              : December 10, 2013
INVENTOR(S)        : Beatty et al.

It is certified that error appears in the above-identified patent and that said Letters Patent is hereby corrected as shown below:

In the Claims:

Claim 18, Column 14, Line 66, please delete "processor:" and substitute -- processor to: --

Signed and Sealed this
Fourth Day of February, 2014

Michelle K. Lee
*Deputy Director of the United States Patent and Trademark Office*